US011669263B1

(12) United States Patent
Ramesh et al.

(10) Patent No.: US 11,669,263 B1
(45) Date of Patent: Jun. 6, 2023

(54) SYSTEMS AND METHODS FOR LOW-OVERHEAD AND FLEXIBLE TRACE CAPTURE TRIGGERED ON-DEMAND BY HARDWARE EVENTS UNDER PRODUCTION LOAD

(71) Applicant: Meta Platforms, Inc., Menlo Park, CA (US)

(72) Inventors: Venkatraghavan Ramesh, Sunnyvale, CA (US); Ta-Yu Wu, Fremont, CA (US); Vineet Parekh, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/320,768

(22) Filed: May 14, 2021

Related U.S. Application Data

(60) Provisional application No. 63/165,368, filed on Mar. 24, 2021.

(51) Int. Cl.
*G06F 3/06* (2006.01)
(52) U.S. Cl.
CPC .......... *G06F 3/0653* (2013.01); *G06F 3/0614* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 6,134,676 A | 10/2000 | VanHuben et al. | |
| 7,284,153 B2 | 10/2007 | Okbay et al. | |
| 7,962,803 B2 | 6/2011 | Huber et al. | |
| 9,519,781 B2 | 12/2016 | Golshan et al. | |
| 9,575,874 B2 | 2/2017 | Gautallin et al. | |
| 9,767,006 B2 | 9/2017 | Krajec et al. | |
| 10,860,455 B2 | 12/2020 | Go et al. | |
| 10,929,038 B1* | 2/2021 | Wang | G06F 9/4881 |
| 2016/0308963 A1* | 10/2016 | Kung | G06F 16/24565 |
| 2019/0004870 A1* | 1/2019 | Filachek | G06F 9/4843 |
| 2020/0242003 A1 | 7/2020 | Merten et al. | |
| 2021/0303270 A1* | 9/2021 | Liu | G06F 8/30 |
| 2022/0052936 A1* | 2/2022 | Chandrasekaran | H04L 43/20 |

\* cited by examiner

*Primary Examiner* — Charles Rones
*Assistant Examiner* — Jonah C Krieger
(74) *Attorney, Agent, or Firm* — Greenberg Traurig, LLP

(57) ABSTRACT

The disclosed computer-implemented method may include configuring a plurality of watcher processes for observing and logging performance of one or more storage devices. Each watcher process may be configured with a trigger condition and a resource limit and organized into tiers based on resource limit. The method may include initiating a first watcher process of a first tier to observe one of the one or more storage devices and monitoring, with a watcher service, the first watcher process for the trigger condition of the first watcher process. The method may further include, in response to detecting the trigger condition, processing an output of the first watcher process and initiating, based on the processed output, a second watcher process of a second tier, wherein the second tier corresponds to a higher resource limit than the first tier. Various other methods, systems, and computer-readable media are also disclosed.

20 Claims, 4 Drawing Sheets

SYSTEMS AND METHODS FOR LOW-OVERHEAD AND FLEXIBLE TRACE CAPTURE TRIGGERED ON-DEMAND BY HARDWARE EVENTS UNDER PRODUCTION LOAD

CROSS REFERENCE TO RELATED APPLICATION

This application claims the benefit of U.S. Provisional Application No. 63/165,368, filed 24 Mar. 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
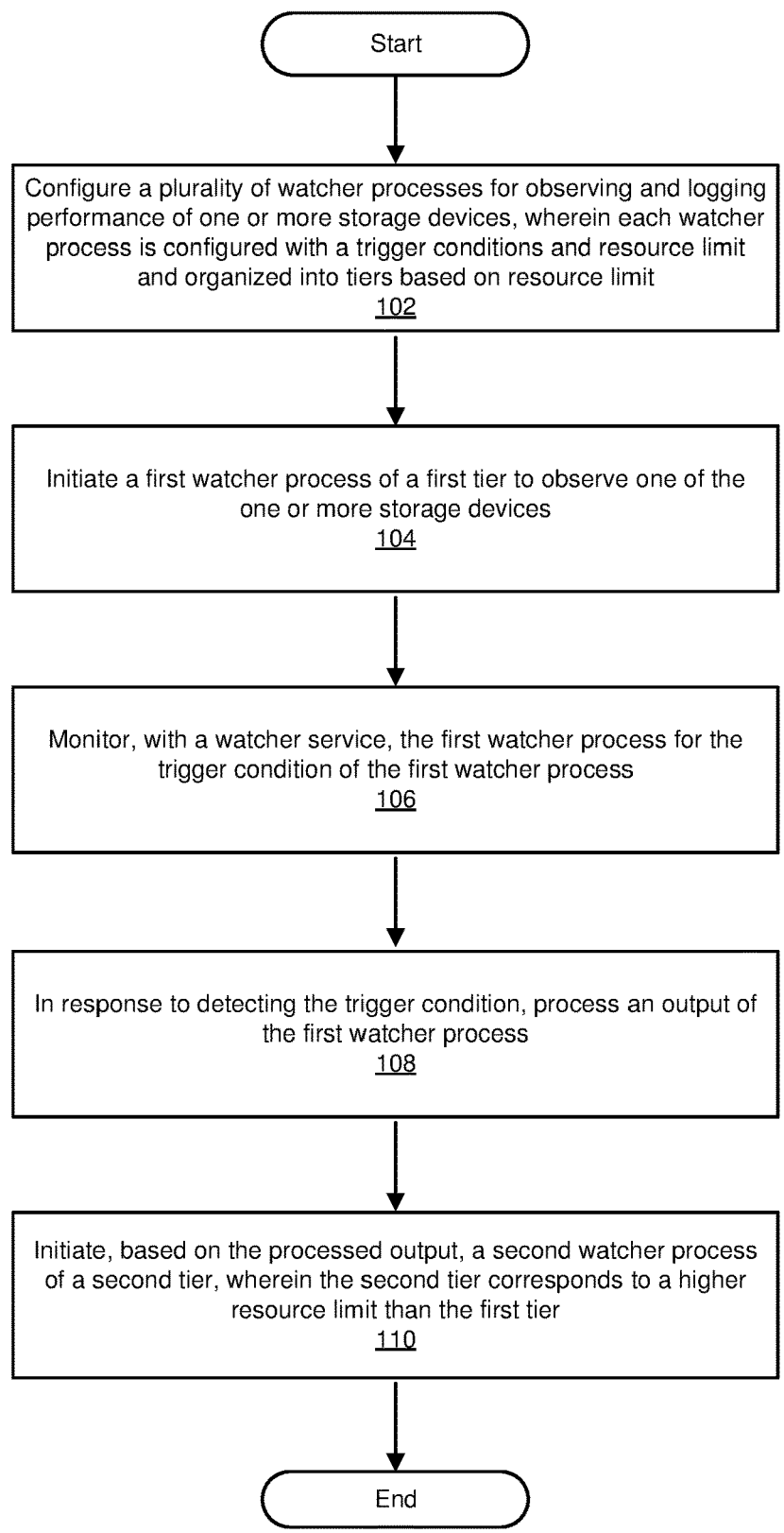
FIG. 1 is a flow diagram of an exemplary method for low-overhead and flexible trace capture triggered on demand by hardware events under production load.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

An organization may manage their storage devices via an extensive hardware observability system built on sampling/profiling which may involve taking periodic snapshots of certain counters, such as a max latency observed on flash drives in the last minute. This sampling/profiling data may be uploaded from every server in the organization's production fleet onto a data store, such as an operational data store ("ODS"), to provide near real-time monitoring capabilities.

However, there are cases where profiling may not provide the full picture and a more granular type of instrumentation called "tracing," which may essentially involve per-event recording for a short burst of time, may be needed. For instance, such a trace may be replayed back on a test system to reproduce the issue quickly. Also, in order to collect the necessary logs for debug, the capability to monitor and trigger these traces as the events arrive, like a bus/logical analyzer does, may be needed, rather than waiting for the logs to be uploaded and post-processed.

Using the example of max-latency on flash drives, it has been observed that that even using a one minute ODS granularity, by the time the latency event is detected through ODS, the event may have already been overrun in drive's internal log (e.g., a circular buffer in the flash drive's dynamic random-access memory ("DRAM") with per event recording) by subsequent input/output ("I/O") operations. When these internal log captures are sent to the flash drive vendor to request a quantification of the risk to the organization's fleet and the root-cause of the issues, the vendor may request reproducing the same issue again in the fleet with a special "trap" firmware loaded onto the drive. This trap firmware may cut off I/Os to the drive when the first latency event of interest is detected and it may do so by dropping it off the system bus, such that the event may be preserved in drive's internal log to provide sufficient clues for root-cause analysis.

Such custom approaches, such as loading special trap firmware to capture relevant information on triggers, may not be scalable because of the need to drain the hosts and put them back in production after uploading this special firmware. Such a procedure may not only involve a lot of engineering time and overhead but may also decrease a chance of reproduction of the original issue due to changes in the configuration. These changes may also cause the original issue to be lost on that particular system while the issue might still be occurring on other hosts. Therefore, there has always existed a strong need for nondestructive tracing of tools, such as blktrace, that may be deployed seamlessly on ailing hosts without requiring changes to their state. There is a need for triggering this trace real-time, such that a sufficient amount of per-event history may be captured for replay and root-cause analysis.

The challenge with the tracing systems may be that, while tracing systems can be enabled on the fly, they may still incur some observer overhead because such tracing systems may tend to consume a marginal amount of system resources on the host under load. Adding additional capabilities, such as post-processing the trace on the fly, triggering from latency events, etc., may significantly increase this observer overhead. Uploading such a verbose trace periodically to do the post-processing offline may only shift the resource consumption to the network stack rather than compute such that the observer overhead may not be adequately addressed.

Disclosed herein is a flexible framework for enabling such tracing on-demand on a subset of ailing systems and managing system resources to keep the observer overhead at acceptable levels while doing near-real time triggering on a best effort basis. The systems and methods described herein may allow multiple ways of configuring triggers for tracing start and end, including those that may use Berkeley Packet Filter ("BPF") based in-kernel computations similar to the ones that may already be used for sampling/profiling counters, and will provide a framework for managing the observer effect/capture verbosity tradeoff. This may reduce the time spent in reproducing transient failures such as latency outliers, speed up root-cause analysis, and may allow appropriate application of mitigation and remediation, to improve reliability of a hardware fleet.

The present disclosure is generally directed to eliminating the need for specialized trap firmware and improving the flow for latency debugging. As will be explained in greater detail below, embodiments of the present disclosure may provide a general purpose on-demand trace capture mechanism that can work with any long-running tracer and may organize these tracers into levels based on overhead potential. The various levels are unlocked based on a heuristic that may attempt to optimize the tradeoff between capture verbosity and observer overhead, providing a way for fast root-cause and remediation with minimal interruption to the services. This system may also improve the functioning of a computing device by providing tracing capability for storage devices while avoiding prohibitive overhead for conventional tracing. The system may further improve the field of data storage technology by providing scalable and flexible analysis for storage devices.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-4, detailed descriptions of systems and methods for low-overhead and flexible trace capture triggered on demand by hardware events under production load. Detailed descriptions of computer-implemented methods for low-overhead and flexible trace capture will be provided in connection with FIG. 1. Detailed descriptions of example systems and network architectures capable of implementing one or more of the embodiments described herein will be provided in connection with FIGS. 2 and 3, respectively. In addition, detailed descriptions of an example architecture will be provided in connection with FIG. 4.

FIG. 1 is a flow diagram of an exemplary computer-implemented method 100 for low-overhead and flexible trace capture triggered on demand by hardware events under production load. The steps shown in FIG. 1 may be performed by any suitable computer-executable code and/or computing system, including the system(s) illustrated in FIGS. 2, 3, and/or 4. In one example, each of the steps shown in FIG. 1 may represent an algorithm whose structure includes and/or is represented by multiple sub-steps, examples of which will be provided in greater detail below.

As illustrated in FIG. 1, at step 102 one or more of the systems described herein may configure a plurality of watcher processes for observing and logging performance of one or more storage devices, wherein each watcher process is configured with a trigger condition and a resource limit and organized into tiers based on resource limit. For example, in FIG. 2 configuration module 204 may configure configuration 222 for watcher process 224.

Figure 2:
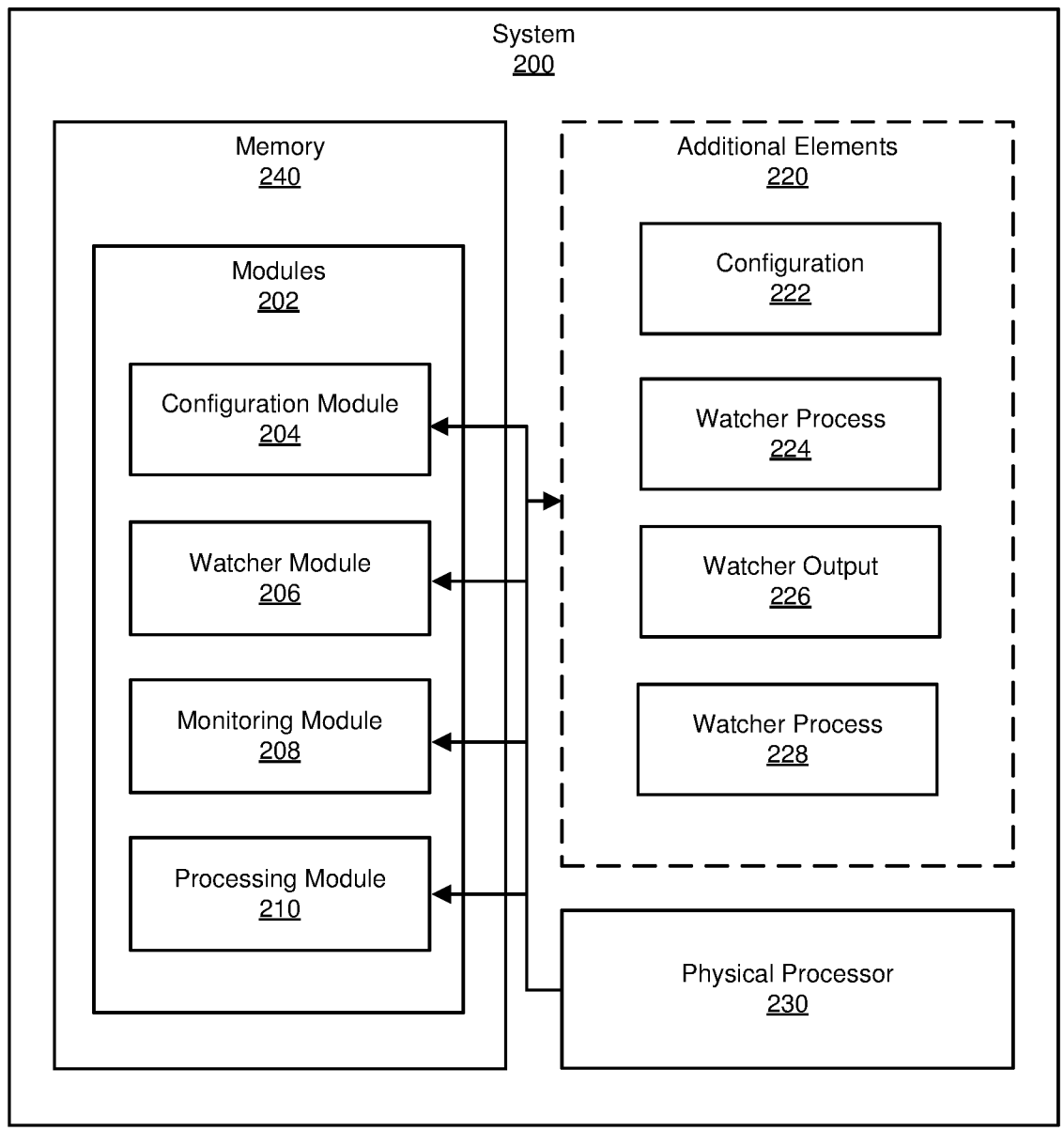
FIG. 2 is a block diagram of an exemplary system for low-overhead and flexible trace capture triggered on demand by hardware events under production load.

In some embodiments, the term "watcher process" may refer to a long-running process in its own process space that may be monitored for early termination and/or other trigger conditions. A watcher process may be configured to monitor specific performance metrics of one or more storage devices and may be configured with resource limitations as will be described further herein. Examples of watcher processes include, without limitation, tracers and other Various systems described herein may perform step 102. FIG. 2 is a block diagram of an example system 200 for low-overhead and flexible trace capture triggered on demand by hardware events under production load. As illustrated in this figure, example system 200 may include one or more modules 202 for performing one or more tasks. As will be explained in greater detail herein, modules 202 may include a configuration module 204, a watcher module 206, a monitoring module 208, and a processing module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 3 (e.g., computing device 302 and/or server 306). One or more of modules 202 in FIG. 2 may also represent all or portions of one or more special-purpose computers configured to perform one or more tasks.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintain the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as a configuration 222, a watcher process 224, a watcher output 226, and a watcher process 228. Configuration 222, watcher process 224, watcher output 226, and/or watcher process 228 may be stored on a local storage device, such as memory 240, or may be accessed remotely. Configuration 222 may represent configuration settings and/or tier organization for watcher process 224 and/or watcher process 228, as will be explained further below. Watcher process 224 and watcher process 228 may represent long-running processes that may be monitored for early termination or other trigger conditions. Watcher output 226 may represent output, such as logs, from one or more watcher processes, such as watcher process 224 and/or watcher process 228.

Example system 200 in FIG. 2 may be implemented in a variety of ways. For example, all or a portion of example system 200 may represent portions of example network environment 300 in FIG. 3.

Figure 3:
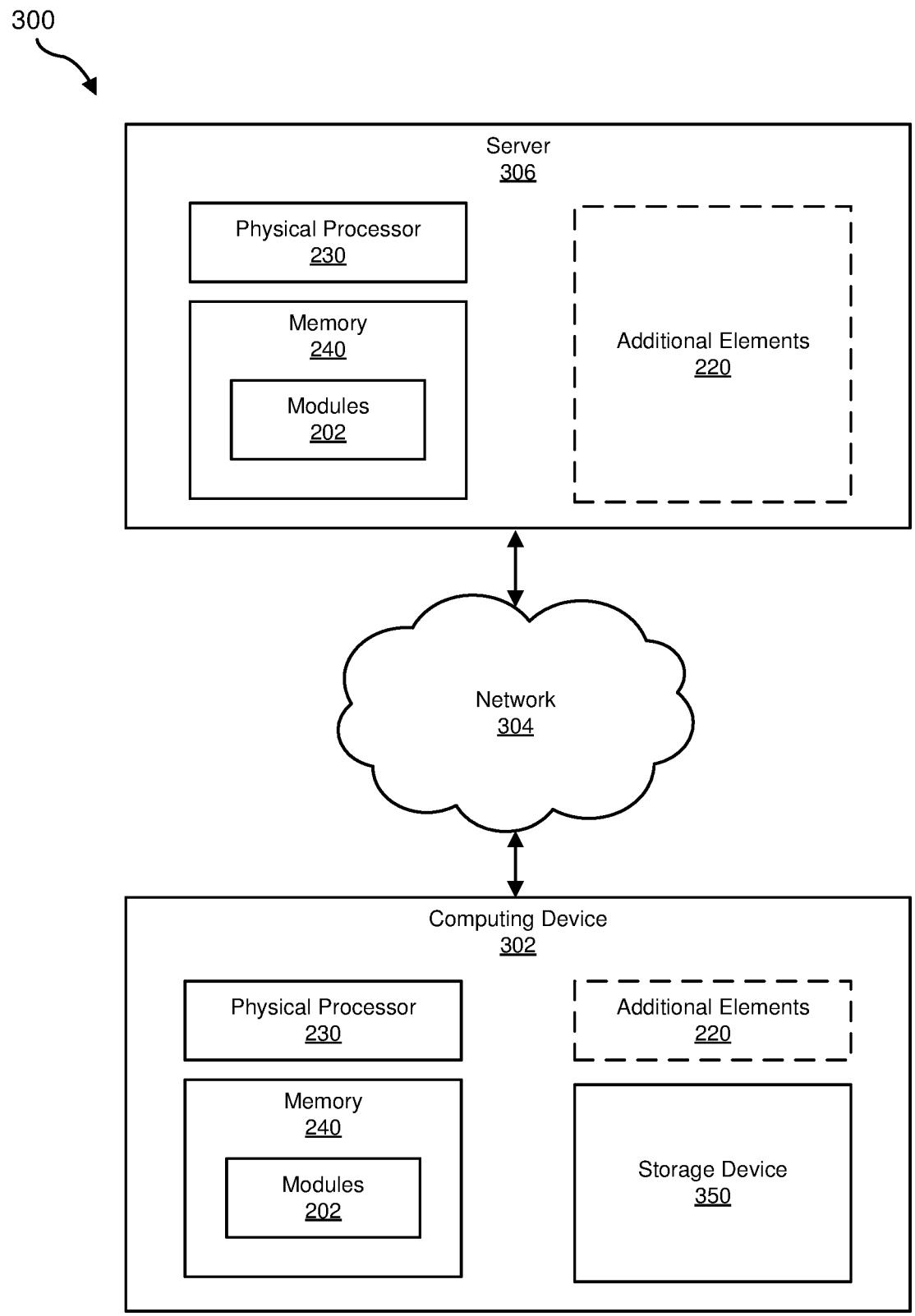
FIG. 3 is a block diagram of an exemplary network for low-overhead and flexible trace capture triggered on demand by hardware events under production load.

FIG. 3 illustrates an exemplary network environment 300 implementing aspects of the present disclosure. The network environment 300 includes computing device 302, a network 304, and server 306. Computing device 302 may be a data server, such as a server of a data center that may be managed by an operational data store ("ODS"), a desktop computer, laptop computer, tablet device, smartphone, or other computing device. Computing device 302 may include a physical processor 230, which may be one or more processors, memory 240, which may store data such as one or more of additional elements 220, and a storage device 350 for long-term data storage (e.g., a flash drive, hard disk drive, etc.). Although storage device 350 is illustrated as part of computing device 302 in FIG. 3, in other examples, storage device 350 may be remotely accessed by computing device 302. For example, storage device 350 may be one of many storage devices in a server and/or server farm.

Server 306 may represent or include one or more servers capable of managing storage devices such as storage device 350. Server 306 may interface with computing device 302 for managing storage device 350. Server 306 may include a physical processor 230, which may include one or more processors, memory 240, which may store modules 202, and one or more of additional elements 220.

Computing device 302 may be communicatively coupled to server 306 through network 304. Network 304 may represent any type or form of communication network, such as the Internet, and may comprise one or more physical connections, such as LAN, and/or wireless connections, such as WAN.

Turning back to FIG. 1, the systems described herein may perform step 102 in a variety of ways. In one example, the trigger condition may include detecting a threshold number of latency events within a time window. For example, the trigger condition may include 10 stalls (e.g., a delay longer than a threshold time such as 100 ms) in one minute. A single stall within a minute may be acceptable, whereas 10 stalls in a minute may be unacceptable and may indicate potential failure that may require further investigation. Other examples of trigger conditions may include measuring performance metrics for storage devices and may relate to conditions that may be indicative of reduced performance.

Watcher process 224 and/or watcher process 228 may be configured by configuration module 204 as part of computing device 302 and/or server 306. In some examples, computing device 302 may interface with or otherwise receive configuration settings (e.g., configuration 222) from server 306.

Figure 4:
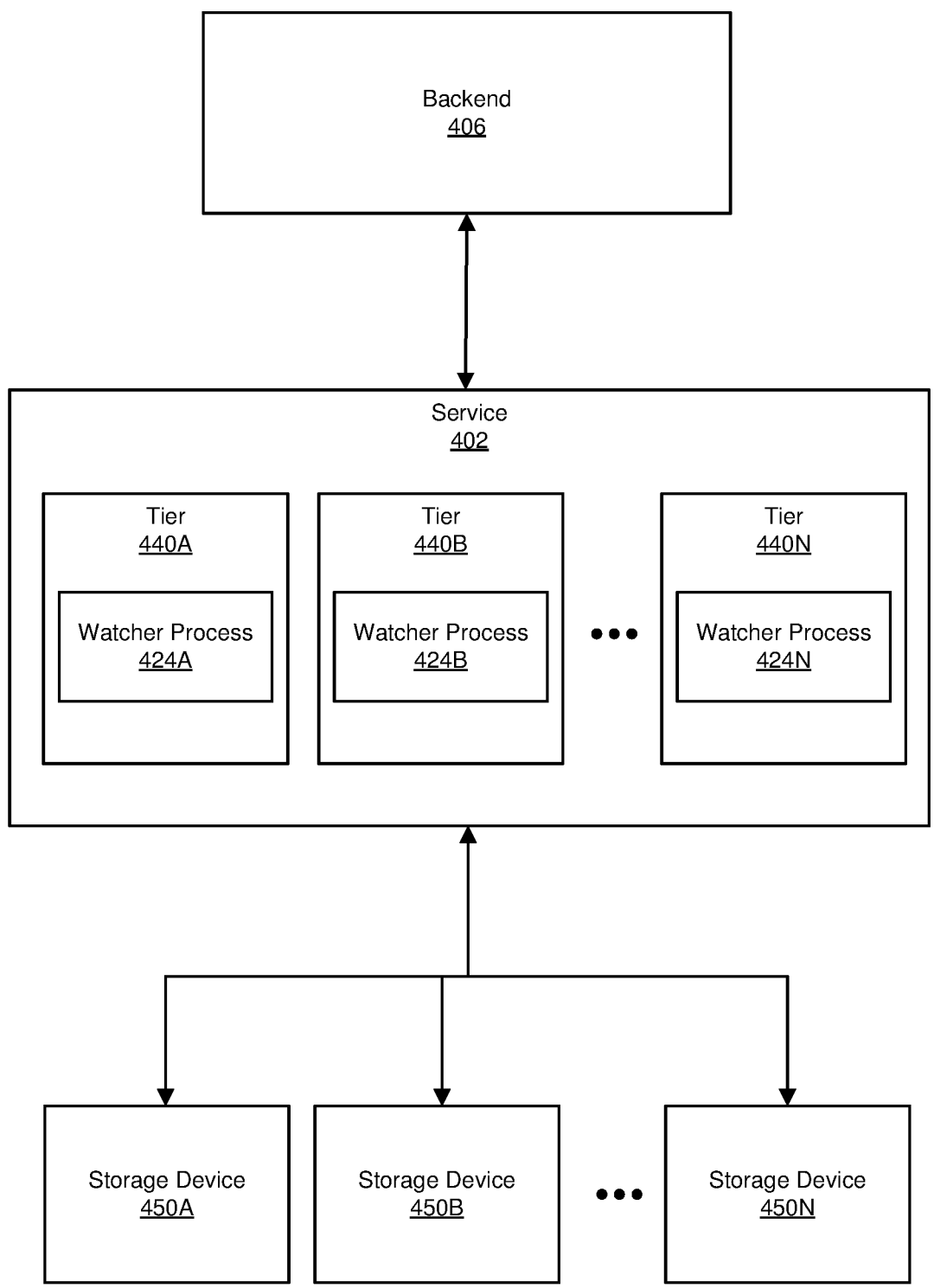
FIG. 4 is a block diagram of an exemplary architecture for low-overhead and flexible trace capture triggered on demand by hardware events under production load.

FIG. 4 illustrates an exemplary architecture for low-overhead and flexible trace capture. As shown in FIG. 4, a service 402 may monitor or otherwise manage storage devices such as storage devices 450A, 450B, . . . 450N, which may correspond to storage device 350. Service 402 may also interface with a backend 406, which may correspond to server 306. Service 402, which may correspond to one or more of configuration module 204, watcher module 206, monitoring module 208, and/or processing module 210 running on computing device 302, may manage watcher processes such as watcher processes 424A, 424B, . . . 424N (which may correspond to watcher process 224 and/or watcher process 228). Watcher processes 424A, 424B, . . . 424N may be organized into tiers 440A, 440B, . . . 440N, respectively.

Service 402 may be, for example, a standalone command-line interface ("CLI") application that may provide the ability to initiate one or more tracers or watcher processes (e.g., watcher processes 424A-N) each in its own separate process space. Each of watcher processes 424A-N may be a long running process that may be monitored by service 402 for early termination upon which a process termination signal (e.g. "sigkill") is raised to other watcher processes, and conversely when a process termination signal is detected due to termination of other watcher processes or as a result of user interrupt, one or more of watcher processes 424A-N may shut down the respective underlying process and exit cleanly.

In one example, service 402 may be invoked by backend 406 with configuration settings (e.g., configuration 222) for watcher processes 424A-N. Each of watcher processes 424A-N may be configured on when to terminate itself using a pre-process routine that may be applied before the underlying command is invoked. Similarly, each of watcher processes 424A-N may optionally be configured to log its output stream to a rotating log (e.g., watcher output 226), whose size may be configured from command line. This output may also be post-processed to look for triggers which may then be used to raise a process termination signal to shut down all watcher processes and end collection. When all watcher processes are shutdown, any after-trigger actions may be performed if the shutdown did occur as a result of a trigger event.

Configuring watcher processes 424A-N may further include organizing watcher processes 424A-N into tiers, such as tiers 440A-N as shown in FIG. 4. Each of tiers 440A-N may be assigned levels corresponding to resource limits. For example, the lowest level (e.g., tier 440A which may be index 0) may be the least expensive invocation that can be run all the time on production boxes even under high load (e.g., having no more overhead than current ODS counters). The highest level (e.g., tier 440N) may include watcher processes that may provide the most information for debugging but may have some noticeable overhead. In some examples, the organization of tiers may be previously determined through experimentation and empirical testing. In addition, the different levels of tiers may be associated with different levels of trigger conditions. For example, lower levels of tiers (having lower resource limitations) may include simple trigger conditions such as specific event counter thresholds, whereas higher levels of tiers (having higher resource limitations) may include more complicated and/or resource intensive trigger conditions, such as conditions involving multiple storage devices, evaluation for longer periods of time, etc.

In some examples, watcher processes 424A-N may be configured with global or default settings and may be further configured with specific settings that may override the global or default settings. For example, watcher process 424A may be configured with a trigger condition associated with tier 440A, but may be further configured to change the trigger condition. In another example, watcher process 424A may be configured with a resource limitation associated with tier 440A, but may be further configured to change the resource limitation.

Turning back to FIG. 1, at step 104 one or more of the systems described herein may initiate a first watcher process of a first tier to observe one of the one or more storage devices. For example, watcher module 206 may initiate watcher process 224 to observe one or more storage devices.

The systems described herein may perform step 104 in a variety of ways. In one example, service 402 may initiate watcher process 424A to observe one or more of storage devices 450A-N. For example, service 402 may initiate a separate watcher process 424A for each of storage devices 450A-N. In some examples, configuration 222 may indicate which of storage devices 450A-N are to be observed, and which of tiers 440A-N and/or watcher processes 424A-N should be initiated for the selected storage device.

At step 106 one or more of the systems described herein may monitor, with a watcher service, the first watcher process for the trigger condition of the first watcher process. For example, monitoring module 208 may monitor watcher process 224 for the trigger condition.

The systems described herein may perform step 106 in a variety of ways. In one example, service 402 may monitor watcher process 424A by monitoring a log output (e.g., watcher output 226) of watcher process 424A. Watcher output 226 may include performance metrics of storage device 450A that may relate to the trigger condition for watcher process 424A. For example, if the trigger condition includes 10 stalls in one minute, service 402 may monitor watcher output 226 for recorded stall events and determine whether 10 stalls occurred within a minute.

In some examples, watcher process 424A may produce signals, such as an interrupt when the trigger condition is met, a process termination signal, etc. Service 402 may monitor watcher process 424A for such signals.

In some examples, service 402 may monitor resource utilization of watcher process 424A. If service 402 detects watcher process 424A exceeding its resource limit, service 402 may throttle watcher process 424A. For example, service 402 may pause watcher process 424A until its resource utilization falls below the resource limit. Alternatively, service 402 may terminate watcher process 424A, for instance if its resource utilization does not fall below the resource limit within a threshold time.

In some examples, service 402 may monitor watcher process 424A for termination conditions in addition to resource utilization described above. For example, service 402 may terminate watcher process 424A if a time threshold is reached before detecting the trigger condition of watcher process 424A such that watcher process 424A may not run indefinitely. In addition, service 402 may detect early termination of another watcher process and in response terminate watcher process 424A.

At step 108 one or more of the systems described herein may in response to detecting the trigger condition, process an output of the first watcher process. For example, processing module 210 may process watcher output 226 of watcher process 224.

The systems described herein may perform step 108 in a variety of ways. In one example, service 402 may provide watcher output 226 to backend 406 for further analysis. In some examples, backend 406 may include a lookup table for actions to take (e.g., initiating another watcher process, performing a diagnostic, flagging a storage device for maintenance, etc.) based on trigger conditions indicated in watcher output 226. In some examples, backend 406 may analyze, using machine learning, watcher output 226 to determine what actions, if any, to take in response to watcher output 226. Backend 406 may provide instructions to service 402 for performing response actions.

At step 110 one or more of the systems described herein may initiate, based on the processed output, a second watcher process of a second tier. The second tier may correspond to a higher resource limit than the first tier. For example, watcher module 206 may initiate watcher process 228.

The systems described herein may perform step 110 in a variety of ways. In one example, service 402 and/or backend 406 may select, based on processing watcher output 226, watcher process 424B from tier 440B, which may have a higher resource limit than tier 440A. In response to the selection, service 402 may initiate watcher process 424B for monitoring storage device 450A. By starting with watcher processes of a lower tier and initiating watcher processes of higher tiers in response to trigger conditions, service 402 may stagger increasingly resource intensive watcher processes in order to manage resource utilization and reduce performance hits due to the watcher processes.

In some examples, service 402 may further monitor for a threshold number of watcher processes for a given tier. For example, service 402 may determine whether a counter associated with tier 440B satisfies a threshold number, which may indicate an upper limit of how many watcher processes of tier 440B are to be active at a given time. The threshold number may correspond to the resource limit such that higher resource limits may be associated with lower threshold numbers to manage resource utilization. If the counter does not satisfy the threshold number, service 402 may initiate watcher process 424B and increase the counter accordingly. In some examples, the threshold number may correspond to a single storage device (e.g., storage device 450A), or may correspond to multiple storage devices (e.g., storage devices 450A-N).

In some examples, service 402 may initiate a third watcher process of the first tier to observe a second storage device. For example, service 402 may initiate or may have previously initiated another instance of watcher process 424A to monitor storage device 450B. Service 402 may initiate watcher process 424B based on detecting the trigger condition for the third watcher process. For instance, backend 406 may instruct service 402 to initiate watcher process 424B based on detecting trigger conditions of multiple watcher processes.

Service 402 may monitor watcher process 424B for its trigger condition. Similar to monitoring watcher process 424A as described above, service 402 may monitor watcher process 424B for its trigger condition, and in response to detecting the trigger condition, process (e.g., by backend 406) an output of watcher process 424B. In some examples, based on the processed output, service 402 may initiate a diagnostic action for the corresponding storage device (e.g., storage device 450A). For instance, backend 406 may determine that rather than initiating a watcher process of the next tier, the combination of detected trigger conditions for storage device 450A may necessitate a diagnostic action. Diagnostic actions may include, for example, disabling storage device 450A, flagging storage device 450A for further maintenance (e.g., for removal and repair), running diagnostic software and/or firmware, etc.

As described herein, the tiers of watcher processes may be enabled in a staggered fashion on production boxes. A tracewatch service may be run at level 0 on all boxes with each tracer at level 0 essentially looking at one particular metric for SLA violation. When any of the tracers are triggered (which may involve looking for n occurrences within a time window as opposed to a single occurrence), a backend service may be consulted to see if proceeding to a next level of tracing is permitted on this system, or if the same tracer is tripped on multiple systems in that tier, whether to ignore this trigger to avoid excessive tracing. If it is determined that starting the next level of tracing is permitted, the counter for number of hosts in the tier being actively traced may be incremented and the system may proceed to start capturing the relevant traces in rotating logs until the trigger is hit again. If the trigger is not hit within a specified time window, this host may revert back to level 0 triggering and may eventually be moved into repair if this host repeatedly remains only at level 0. On the other hand, if the trigger does occur under active tracing, then the capture may be uploaded and quarantining the host may be initiated. The quarantine phase may be configured differently for different tiers depending on their tolerance for collecting additional diagnostic logs under production workload or being able to move the host to running shadow traffic to be able to do so. In the quarantine phase, tracing may be started again, with an after-trigger option specified that may involve capturing diagnostic logs. Subsequently, the host may be moved into a lemon pool and the ability of the capture trace to reproduce the issue may be validated before proceeding to repair the host. If the trace replay does not reproduce the issue, the available context and logs may be sufficient for workload understanding to make root-cause analysis much quicker The host may be sent for repair and testing out if the tracefile captured by nvmestat.bt can be replayed to reproduce this issue on any drive. If repair is successful, a repro recipe for the issue may be available, otherwise the trace may have to be analyzed to generate a synthetic workload which can be wrapped around trace level 2 and run for issue reproduction.

The CLI may run an arbitrary number of tracers (also referred to herein as "watcher processes") in a synchronized fashion. A tracer may be a named process that may launch a command in a process group, log the process' output to a log-rotated stream, monitor for resource limits imposed on that tracer, and stop on a predefined trigger. A trigger on one tracer may stop capture on all the tracers. Triggers themselves may be from either a dedicated trigger program built on top of BPF (that may take advantage of in-kernel computations for keeping overhead low), or obtained from post-processing the trace output in a user space or from the workload generator itself detecting the trigger condition and exiting. The CLI may be deployed as a daemon/systemd service on all production hosts, and the service may await the trigger start condition and list of tracers to run along with arguments from the backend. After the trigger is hit, the post-trigger action may be executed which may perform additional log captures and update the captured trace/logs to a backend, further triggering the next state transition in the tracewatch backend state machine.

The tracewatch backend may be responsible for managing the state/tracing level that each host is currently in. All production hosts may start in the base mode, where profiling/sampling of certain counters may be done. When the tracewatch service on the host signals to the backend that the first level trigger has been hit, the triggered output may be automatically processed and the backend may look up a "runbook" to determine the exact combination of tracers (e.g., "tracing recipe") that may be appropriate for this debug, given the resource limits imposed at this level. There may be multiple such "levels" where an increasingly smaller number of the triggered hosts may be put in various degraded states (such as running traffic on this node, but returning query results for a user from a replica, instead, etc.) and at each level, the output of the previous level and the available menu of tracing recipes may be consulted to collect as much debug information as possible before the host is taken out for repair. At each level, there may be a rate-limit on number of hosts to promote to a next level. The pre-programmed next tracing recipe at each level may be manually over-ridden or may also be learned by an adaptive system built on the tagging derived from eventual remediation.

An experimentation platform may be used for determining tracing recipes, by running sweeps with a given group of tracers that are deemed useful for a given debug and then binning the tracer combination (e.g. tracing recipe) into the appropriate tracewatch level.

The tracing recipes may include a combination of tracers geared towards a particular observability goal, given a resource limit specific to a type of application (database vs. cache, etc.). Different recipes may be packaged into plugins for a particular use case and traded as entities on an observability tools marketplace. This may promote further innovation in application/hardware observability in the fleet, by lowering the barrier to build and sell high quality tracing solutions, that may be competitive to other available software and hardware-based offerings.

The tracing recipe and runbook marketplace, which may host a variety of free as well as paid tracing solutions, may provide alternates to the niche hardware-based/custom kernel-based offerings conventionally available. In addition, the reduced time for debugging and/or engineering effort required may also promote indirect cost savings.

The following is an example of how this solution would help a systems engineer/SRE working on debugging a flash latency issue in the fleet. All the hosts in the fleet may have tracewatch installed. A particular DB fleet may opt in to install the "flash-latency-debug" plugin, which may be a package of several tracers organized into various levels based on predefined resource limits.

The production engineer/SRE for the DB may go to the tracewatch market-place and evaluate various offerings for the "flash-latency-plugin," some of which may be free (for example built on GPL licensed open-source tools such as BPF), and others may be behind a license (based on custom kernel enablement or additional binary installs). The plugin itself may consist of a several tracing recipes and a runbook for transitioning between recipes at various levels. One example of a flash-latency debug plugin may be configured as follows:

At level 0, use a bpftrace script to detect latency between two probes—block_bio_queue and block_rq_complete (less than 1% CPU overhead, no memory/storage overhead). When 9 max latency stalls over a 1 second period are detected within an hour at level 0, transition to level 1 on a maximum of 100 triggered hosts within the last 30 days.

At level 1, run blktrace log capture (log rotated for 1 GB of total logs in 200M chunks), along with continuing to run bpftrace script for triggering again on latency. The overhead here may be 1G storage, 2% memory overhead and 8% CPU overhead. After the level 1 trigger is hit, the logs are uploaded to the backend, where a blktrace parser runs to suggest the recommended next level of capture. The parser determines that the latency occurs between block_bio_queue and block_rq_insert, which may mean that the block scheduler and interrupt flooding need to be investigated, so it picks a recipe from level 2 among all the recipes at that level, which focusses on capturing IRQ interrupts and scheduler events. Since level 2 may have more invasive limits (up to CPU saturation of one core, plus 20% memory overhead) the primary node for the replica-set may be switched to serve from a different node which is not under level 2 capture, but the requests may be shadowed to this node as well. Rebuild of this node can also start in parallel, to prepare for this node to be removed in level 3.

When a level 2 trigger is hit, sufficient information may be available for debug/fix and so, this subset of machines may be moved to repair and auto-remediate via a reimage. The logs up to level 2 may be packaged and the appropriate team can download them from the portal and send it for root-cause.

If the issue at level 1 trigger was instead determined to be a device issue, then level 2 may consist of simply running the same tracer combo as level 1 but with a post trigger option of capturing drive internal log as soon as latency is triggered. The machine may then go straight into repair at level 3 and optionally play back the block trace in repair to make sure the issue can be reproduced with the captured trace+precondition. The information about whether the repro recipe was successful may also be captured in the logs and the logs may be shipped to the drive vendor.

The production engineer may also have the option to build their own runbook, mixing and matching recipes from various plugins based on their particular use-case and to ship this runbook to the observability tools marketplace optionally.

EXAMPLE EMBODIMENTS

Example 1: A method comprising: (a) configuring a plurality of watcher processes for observing and logging performance of one or more storage devices, wherein each watcher process is configured with a trigger condition and a resource limit and organized into tiers based on resource limit; (b) initiating a first watcher process of a first tier to observe one of the one or more storage devices; (c) monitoring, with a watcher service, the first watcher process for the trigger condition of the first watcher process; (d) in response to detecting the trigger condition, processing an output of the first watcher process; and (e) initiating, based on the processed output, a second watcher process of a second tier, wherein the second tier corresponds to a higher resource limit than the first tier.

Example 2: The method of Example 1, further comprising terminating the first watcher process in response to at least one of: exceeding the resource limit of the first watcher process; reaching a time threshold before detecting the trigger condition; or detecting early termination of another watcher process.

Example 3: The method of Example 1 or 2, further comprising: detecting the first watcher process exceeding the resource limit; and throttling the first watcher process.

Example 4: The method of Example 1, 2, or 3, wherein initiating the second watcher process further comprises: selecting, based on the processed output, the second watcher process from the second tier; and initiating the second watcher process in response to the selection.

Example 5: The method of any of Examples 1-4, wherein initiating the second watcher process further comprises: determining whether a counter associated with the second tier satisfies a threshold number; initiating the second watcher process when the counter does not satisfy the threshold number; and increasing the counter.

Example 6: The method of any of Examples 1-5, further comprising: initiating a third watcher process of the first tier to observe a second of the one or more storage devices; wherein initiating the second watcher process is further based on detecting the trigger condition of the third watcher process.

Example 7: The method of any of Examples 1-6, further comprising: monitoring, with the watcher service, the second watcher process for the trigger condition of the second watcher process; in response to detecting the trigger condition of the second watcher process, processing an output of the second watcher process; and initiating, based on the processed output of the second watcher process, a diagnostic action for the one of the one or more storage devices.

Example 8: The method of any of Examples 1-7, wherein the trigger condition includes detecting a threshold number of latency events within a time window.

Example 9: A system comprising: at least one physical processor; physical memory comprising computer-executable instructions that, when executed by the physical processor, cause the physical processor to: (a) configure a plurality of watcher processes for observing and logging performance of one or more storage devices, wherein each watcher process is configured with a trigger condition and a resource limit and organized into tiers based on resource limit; (b) initiate a first watcher process of a first tier to observe one of the one or more storage devices; (c) monitor, with a watcher service, the first watcher process for the trigger condition of the first watcher process; (d) in response to detecting the trigger condition, process an output of the first watcher process; and (e) initiate, based on the processed output, a second watcher process of a second tier, wherein the second tier corresponds to a higher resource limit than the first tier.

Example 10: The system of Example 9, further comprising instructions for terminating the first watcher process in response to at least one of: exceeding the resource limit of the first watcher process; reaching a time threshold before detecting the trigger condition; or detecting early termination of another watcher process.

Example 11: The system of Example 9 or 10, further comprising instructions for: detecting the first watcher process exceeding the resource limit; and throttling the first watcher process.

Example 12: The system of any of Examples 9-11, wherein initiating the second watcher process further comprises instructions for: selecting, based on the processed output, the second watcher process from the second tier; and initiating the second watcher process in response to the selection.

Example 13: The system of any of Examples 9-12, wherein instructions for initiating the second watcher process further comprises instructions for: determining whether a counter associated with the second tier satisfies a threshold number; initiating the second watcher process when the counter does not satisfy the threshold number; and increasing the counter.

Example 14: The system of any of Examples 9-13, further comprising instructions for: initiating a third watcher process of the first tier to observe a second of the one or more storage devices; wherein initiating the second watcher process is further based on detecting the trigger condition of the third watcher process.

Example 15: The system of any of Examples 9-14, further comprising instructions for: monitoring, with the watcher service, the second watcher process for the trigger condition of the second watcher process; in response to detecting the trigger condition of the second watcher process, processing an output of the second watcher process; and initiating, based on the processed output of the second watcher process, a diagnostic action for the one of the one or more storage devices.

Example 16: A non-transitory computer-readable medium comprising one or more computer-executable instructions that, when executed by at least one processor of a computing device, cause the computing device to: (a) configure a plurality of watcher processes for observing and logging performance of one or more storage devices, wherein each watcher process is configured with a trigger condition and a resource limit and organized into tiers based on resource limit; (b) initiate a first watcher process of a first tier to observe one of the one or more storage devices; (c) monitor, with a watcher service, the first watcher process for the trigger condition of the first watcher process; (d) in response to detecting the trigger condition, process an output of the first watcher process; and (e) initiate, based on the processed output, a second watcher process of a second tier, wherein the second tier corresponds to a higher resource limit than the first tier.

Example 17: The non-transitory computer-readable medium of Example 16, further comprising instructions for terminating the first watcher process in response to at least one of: exceeding the resource limit of the first watcher process; reaching a time threshold before detecting the trigger condition; or detecting early termination of another watcher process.

Example 18: The non-transitory computer-readable medium of Example 16 or 17, wherein initiating the second watcher process further comprises instructions for: selecting, based on the processed output, the second watcher process from the second tier; and initiating the second watcher process in response to the selection.

Example 19: The non-transitory computer-readable medium of any of Examples 16-18, wherein instructions for initiating the second watcher process further comprises instructions for: determining whether a counter associated with the second tier satisfies a threshold number; initiating the second watcher process when the counter does not satisfy the threshold number; and increasing the counter.

Example 20: The non-transitory computer-readable medium of any of Examples 16-19, further comprising instructions for: monitoring, with the watcher service, the second watcher process for the trigger condition of the second watcher process; in response to detecting the trigger condition of the second watcher process, processing an output of the second watcher process; and initiating, based on the processed output of the second watcher process, a diagnostic action for the one of the one or more storage devices.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive log data to be transformed, transform the log data, output a result of the transformation to analyze performance, use the result of the transformation to select a response action, and store the result of the transformation to manage resource utilization. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   configuring a plurality of watcher processes for observing and logging performance of one or more storage devices, wherein each watcher process is configured with a trigger condition and a resource limit and organized into tiers based on resource limits for the trigger conditions;
   initiating a first watcher process of a first tier to observe one of the one or more storage devices;
   monitoring, with a watcher service, the first watcher process for the trigger condition of the first watcher process;
   in response to detecting the trigger condition, processing an output of the first watcher process to determine a debug procedure;
   selecting a second watcher process of a second tier indicated by the debug procedure, wherein the second tier corresponds to a higher resource limit for trigger conditions than the first tier; and
   initiating the second watcher process.

2. The method of claim 1, further comprising terminating the first watcher process in response to at least one of:
   exceeding the resource limit of the first watcher process;
   reaching a time threshold before detecting the trigger condition; or
   detecting early termination of another watcher process.

3. The method of claim 1, further comprising:
   detecting the first watcher process exceeding the resource limit; and
   throttling the first watcher process.

4. The method of claim 1, wherein initiating the second watcher process further comprises:
   selecting, based on the processed output, the second watcher process from the second tier; and
   initiating the second watcher process in response to the selection.

5. The method of claim 1, wherein initiating the second watcher process further comprises:
   determining whether a counter associated with the second tier satisfies a threshold number;
   initiating the second watcher process when the counter does not satisfy the threshold number; and
   increasing the counter.

6. The method of claim 1, further comprising:
   initiating a third watcher process of the first tier to observe a second of the one or more storage devices;
   wherein initiating the second watcher process is further based on detecting the trigger condition of the third watcher process.

7. The method of claim 1, further comprising:
   monitoring, with the watcher service, the second watcher process for the trigger condition of the second watcher process;
   in response to detecting the trigger condition of the second watcher process, processing an output of the second watcher process; and
   initiating, based on the processed output of the second watcher process, a diagnostic action for the one of the one or more storage devices.

8. The method of claim 1, wherein the trigger condition includes detecting a threshold number of latency events within a time window.

9. A system comprising:
   at least one physical processor; and
   physical memory comprising computer-executable instructions that, when executed by the physical processor, cause the physical processor to:
   configure a plurality of watcher processes for observing and logging performance of one or more storage devices, wherein each watcher process is configured with a trigger condition and a resource limit and organized into tiers based on resource limits for the trigger conditions;
   initiate a first watcher process of a first tier to observe one of the one or more storage devices;
   monitor, with a watcher service, the first watcher process for the trigger condition of the first watcher process;
   in response to detecting the trigger condition, process an output of the first watcher process to determine a debug procedure;
   select a second watcher process of a second tier indicated by the debug procedure, wherein the second tier corresponds to a higher resource limit for trigger conditions than the first tier; and
   initiate the second watcher process.

10. The system of claim 9, further comprising instructions for terminating the first watcher process in response to at least one of:
    exceeding the resource limit of the first watcher process;
    reaching a time threshold before detecting the trigger condition; or
    detecting early termination of another watcher process.

11. The system of claim 9, further comprising instructions for:
    detecting the first watcher process exceeding the resource limit; and
    throttling the first watcher process.

12. The system of claim 9, wherein instructions for initiating the second watcher process further comprises instructions for:
    selecting, based on the processed output, the second watcher process from the second tier; and
    initiating the second watcher process in response to the selection.

13. The system of claim 9, wherein instructions for initiating the second watcher process further comprises instructions for:
    determining whether a counter associated with the second tier satisfies a threshold number;
    initiating the second watcher process when the counter does not satisfy the threshold number; and
    increasing the counter.

14. The system of claim 9, further comprising instructions for:
    initiating a third watcher process of the first tier to observe a second of the one or more storage devices;
    wherein initiating the second watcher process is further based on detecting the trigger condition of the third watcher process.

15. The system of claim 9, further comprising instructions for:
    monitoring, with the watcher service, the second watcher process for the trigger condition of the second watcher process;
    in response to detecting the trigger condition of the second watcher process, processing an output of the second watcher process; and
    initiating, based on the processed output of the second watcher process, a diagnostic action for the one of the one or more storage devices.

16. A non-transitory computer-readable medium comprising one or more computer-executable instructions that, when executed by at least one processor of a computing device, cause the computing device to:
 configure a plurality of watcher processes for observing and logging performance of one or more storage devices, wherein each watcher process is configured with a trigger condition and a resource limit and organized into tiers based on resource limits for the trigger conditions;
 initiate a first watcher process of a first tier to observe one of the one or more storage devices;
 monitor, with a watcher service, the first watcher process for the trigger condition of the first watcher process;
 in response to detecting the trigger condition, process an output of the first watcher process to determine a debug procedure;
 select a second watcher process of a second tier indicated by the debug procedure, wherein the second tier corresponds to a higher resource limit for trigger conditions than the first tier; and
 initiate the second watcher process.

17. The non-transitory computer-readable medium of claim 16, further comprising instructions for terminating the first watcher process in response to at least one of:
 exceeding the resource limit of the first watcher process;
 reaching a time threshold before detecting the trigger condition; or
 detecting early termination of another watcher process.

18. The non-transitory computer-readable medium of claim 16, wherein initiating the second watcher process further comprises instructions for:
 selecting, based on the processed output, the second watcher process from the second tier; and
 initiating the second watcher process in response to the selection.

19. The non-transitory computer-readable medium of claim 16, wherein instructions for initiating the second watcher process further comprises instructions for:
 determining whether a counter associated with the second tier satisfies a threshold number;
 initiating the second watcher process when the counter does not satisfy the threshold number; and
 increasing the counter.

20. The non-transitory computer-readable medium of claim 16, further comprising instructions for:
 monitoring, with the watcher service, the second watcher process for the trigger condition of the second watcher process;
 in response to detecting the trigger condition of the second watcher process, processing an output of the second watcher process; and
 initiating, based on the processed output of the second watcher process, a diagnostic action for the one of the one or more storage devices.

* * * * *